(12) United States Patent
Andreasch et al.

(10) Patent No.: US 7,244,035 B2
(45) Date of Patent: Jul. 17, 2007

(54) DEVICE FOR DEFLECTING A LASER BEAM

(75) Inventors: Wolfgang Andreasch, Weinstadt (DE); Michael Haecker, Wimsheim (DE)

(73) Assignee: Trumpf Lasertechnik GmbH, Ditzingen (DE)

( * ) Notice: Subject to any disclaimer, the term of this patent is extended or adjusted under 35 U.S.C. 154(b) by 0 days.

(21) Appl. No.: 11/127,307

(22) Filed: May 12, 2005

(65) Prior Publication Data
US 2006/0001990 A1    Jan. 5, 2006

Related U.S. Application Data

(63) Continuation of application No. PCT/EP03/12488, filed on Nov. 8, 2003.

(30) Foreign Application Priority Data
Nov. 12, 2002   (DE)   ............................... 102 52 443

(51) Int. Cl.
   *G02B 5/08*   (2006.01)
   *G02B 7/182*  (2006.01)
(52) U.S. Cl. ..................... 359/876; 359/872
(58) Field of Classification Search ................ 359/855, 359/856, 857, 872, 873, 874, 876, 877, 881
   See application file for complete search history.

(56) References Cited

U.S. PATENT DOCUMENTS

| | | | |
|---|---|---|---|
| 4,678,289 A | 7/1987 | Mattelin et al. | |
| 5,015,071 A * | 5/1991 | Richter et al. | ............... 359/850 |
| 5,504,630 A * | 4/1996 | Hansen | ........................ 359/856 |
| 5,734,515 A * | 3/1998 | Shaffer | ......................... 359/857 |
| 5,751,460 A * | 5/1998 | Harrell et al. | ............... 359/198 |
| 5,815,302 A * | 9/1998 | Mc Vey et al. | .............. 359/214 |
| 6,057,915 A | 5/2000 | Squire et al. | |
| 6,296,362 B1 * | 10/2001 | Tinti et al. | ................... 359/871 |

FOREIGN PATENT DOCUMENTS

| | | |
|---|---|---|
| EP | 0 179 275 | 4/1986 |
| WO | WO 2004/044640 A2 * | 5/2004 |

* cited by examiner

Primary Examiner—Ricky D. Shafer
(74) Attorney, Agent, or Firm—Fish & Richardson P.C.

(57) ABSTRACT

An apparatus for deflecting a laser beam includes a deflecting mirror disposed in a holder, a lever, a rotatable coupler, and a drive member. The mirror is pivotable about a first pivot axis lying on a surface of the mirror, and the holder is rotatable about a second pivot axis oriented substantially perpendicular to the first pivot axis to cause the mirror to rotate about the second pivot axis. The lever is coupled to the mirror along a first lever axis parallel to and separated from the first pivot axis. The rotatable coupler is coupled to the lever along a second lever axis parallel to and separated from the first pivot axis, the coupler is rotatable about the second pivot axis, and the rotatable coupler and the holder are longitudinally translatable relative to each other along the second pivot axis. The drive member is coupled to the holder, and the drive member is longitudinally translatable along the second pivot axis to cause the mirror to rotate about the first pivot axis.

22 Claims, 2 Drawing Sheets

DEVICE FOR DEFLECTING A LASER BEAM

CROSS-REFERENCE TO RELATED APPLICATIONS

This application is a continuation application of and claims priority from PCT Application Ser. No. PCT/EP03/012488, filed on Nov. 8, 2003, the entire contents of which are hereby incorporated by reference. The PCT application claims priority to German Patent Application No. 102 52 443.2, filed Nov. 12, 2002, which is also incorporated herein by reference.

TECHNICAL FIELD

This disclosure relates to laser processing and, more particularly, to a device for deflecting a laser beam.

BACKGROUND

Conventional devices (e.g., as disclosed in European Patent Document EP 0 179 275 A1) provide two-dimensional deflection of a laser beam that impinges on the deflecting mirror. Towards this end, the deflecting mirror can be tilted about two pivot axes disposed at right angles relative to each other and whose point of intersection is in the mirror surface, thereby forming a rotating fixed point. The deflecting mirror can be supported in a frame that allows pivoting about the first pivot axis. The frame can be supported in such a manner to pivot about the other, second pivot axis, and the frame can be rotated using a drive spindle. The rotating motion of a further drive spindle can be transferred into a pivoting motion of the deflecting mirror about the first pivot axis using a rotating arm having a slit into which a tappet engages, the tappet being fixed to the rear side of the deflecting mirror. The deflecting mirror can be tilted to all sides relative to the rotating fixed point by pivoting the deflecting mirror about the first pivot axis and the frame about the second pivot axis.

SUMMARY

In a first general aspect, an apparatus for deflecting a laser beam includes a deflecting mirror disposed in a holder, a lever, a rotatable coupler, and a drive member. The mirror is pivotable about a first pivot axis lying on a surface of the mirror, and the holder is rotatable about a second pivot axis oriented substantially perpendicular to the first pivot axis to cause the mirror to rotate about the second pivot axis. The lever is coupled to the mirror along a first lever axis parallel to and separated from the first pivot axis. The rotatable coupler is coupled to the lever along a second lever axis parallel to and separated from the first pivot axis, the coupler is rotatable about the second pivot axis, and the rotatable coupler and the holder are longitudinally translatable relative to each other along the second pivot axis. The drive member is coupled to the holder, and the drive member is longitudinally translatable along the second pivot axis to cause the mirror to rotate about the first pivot axis.

Implementations can include one or more of the following features. For example, the rotatable coupler can be disposed such that it cannot be longitudinally displaced along the second pivot axis to translate the first pivot axis while the first lever axis remains fixed and thereby rotate the mirror about the first pivot axis. The holder can be disposed between the deflecting mirror and the rotatable coupler. The drive member can extend through a central opening of the rotatable coupler to couple to the holder.

The apparatus can include a rotary translation drive member connected to the drive member, where the rotary translation drive member is longitudinally translatable to longitudinally translate the drive member along the second pivot axis, and where the rotary translation drive member is rotatable to rotate the holder about the second pivot axis. The drive member and the rotatable coupler can be rotationally coupled to each other.

In another general aspect, an apparatus for deflecting a laser beam includes a deflecting mirror disposed in a holder, a lever, a rotatable coupler, and a drive member. The mirror is pivotable about a first pivot axis lying on a surface of the mirror, and the holder is rotatable about a second pivot axis oriented substantially perpendicular to the first pivot axis. The lever is coupled to the mirror along a first lever axis parallel to and separated from the first pivot axis. The rotatable coupler is coupled to the lever along a second lever axis parallel to and separated from the first pivot axis, the coupler is rotatable about the second pivot axis to cause the mirror and the lever to rotate about the second pivot axis, and the rotatable coupler and the holder are longitudinally translatable relative to each other along the second pivot axis. The drive member is coupled to the coupler, and the drive member is longitudinally translatable along the second pivot axis to cause the mirror to rotate about the first pivot axis.

Implementations can include one or more of the following features. For example, the holder can be disposed such that it cannot be displaced to translate the first lever axis while the first pivot axis remains fixed and thereby rotate the mirror about the first pivot axis. The rotatable coupler can be disposed between the deflecting mirror and the holder. The drive member can extend through a central opening of the holder to couple to the rotatable coupler. The rotatable coupler can be disposed on the drive member such that it can be rotated but cannot be longitudinally displaced along the second pivot axis. The rotatable coupler and the drive member can be coupled rigidly to each other, and the drive member can be rotated about the second pivot axis but not be axially displaced. The apparatus can further include a linear driver connected to the drive member for linearly displacing the rotatable coupling member and/or a rotary drive rotationally coupled to the drive member.

The details of one or more implementations are set forth in the accompanying drawings and the description below. Other features will be apparent from the description and drawings, and from the claims.

DESCRIPTION OF DRAWINGS

Like reference symbols in the various drawings indicate like elements.

DETAILED DESCRIPTION

Figure 1:
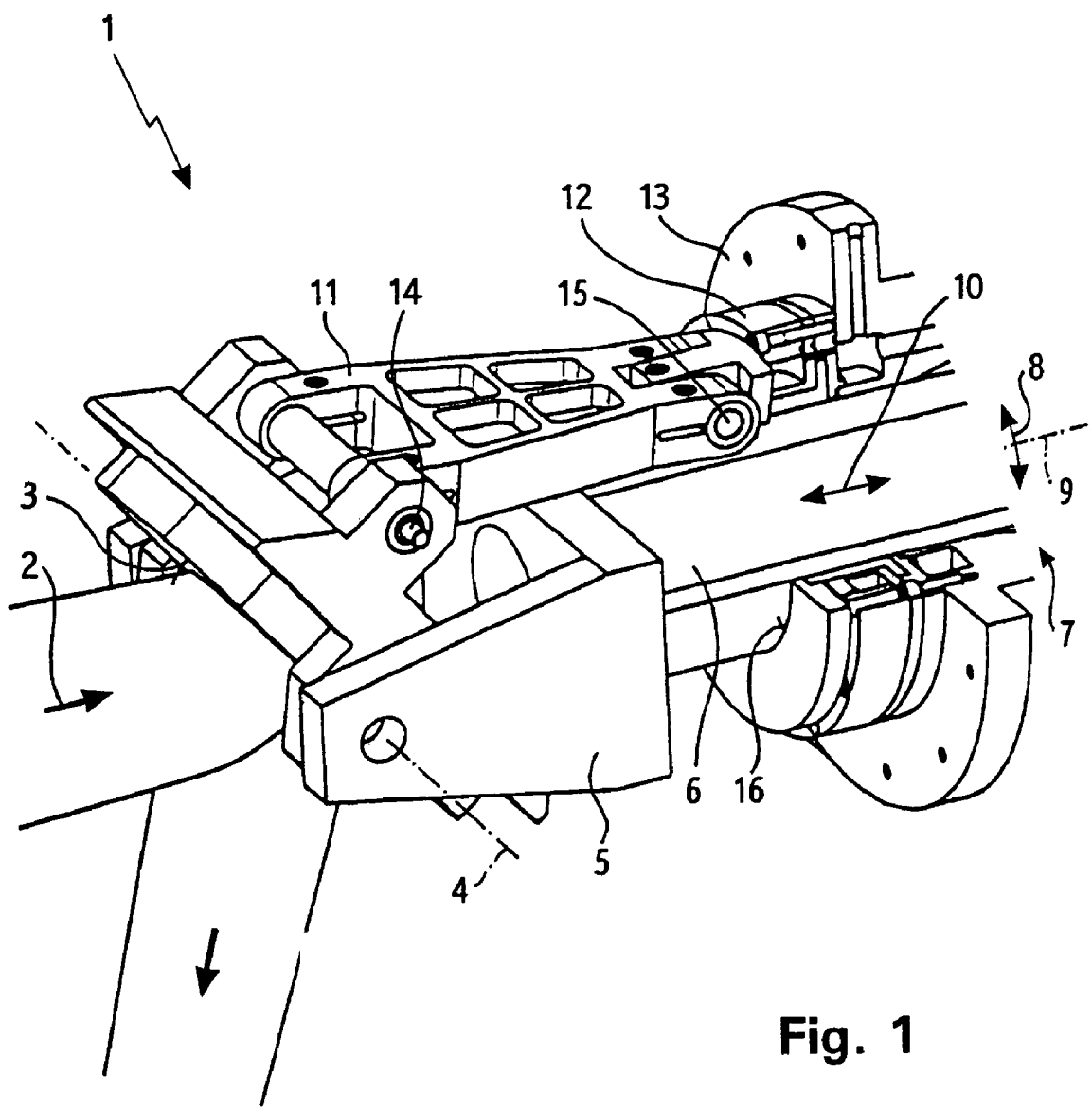
FIG. 1 is a schematic perspective view of a device for deflecting a laser beam.

The device 1 shown in FIG. 1 serves to deflect a laser beam 2 with a deflecting mirror 3 disposed in a fork-shaped holder 5 that allows pivoting of the mirror 3 about a first pivot axis 4. The holder 5 is mounted to a drive element 6 of a rotary translation drive 7 that can perform, either simultaneously or separately, a rotational motion (as shown by double arrow 8) about a second pivot axis 9 that extends at a right angle to the first pivot axis 4 or a translational motion along the second pivot axis (as shown by double arrow 10). The rotary translation drive 7 may be designed as a combination of a tubular linear motor and a torque motor. The primary and secondary parts of the torque motor have different lengths. The second pivot axis 9 extends collinearly to the optical axis of the laser beam 2 that impinges on the deflecting device 1. The deflecting mirror 3 is articulated through a lever 11 coupled to an annular connecting element 12 rotatable coupler that is disposed on a housing flange 13 of the rotary translation drive 7 such that it cannot be axially displaced but can be rotated about the second pivot axis 9. The lever 11 is disposed on the rear side of the deflecting mirror 3 and on the connecting element 12 in such a manner as to rotate about axes 14 and 15 that each extend parallel to the first pivot axis 4. The drive element 6 extends through the annular opening 16 of the connecting element 12 to the holder 5 that is disposed between the deflecting mirror 3 and the connecting element 12.

Additionally, a rotary coupling (not shown in FIG. 1) may be provided between the drive element 6 and the connecting element 12.

The holder 5 and hence also the deflecting mirror 3 can be pivoted about the second pivot axis 9 through rotation of the drive element 6. A translational motion of the drive element 6 along the second pivot axis 9 displaces the holder 5 relative to the connecting element 12. Since the connecting element 12 is disposed such that it cannot be displaced, the deflecting mirror 3 is pivoted about the first pivot axis 4. The deflecting mirror 3 can be arbitrarily tilted about both pivot axes 4 and 9 through simultaneous pivoting and displacing of the holder 5 using the drive element 6, thereby deflecting the impinging laser beam 2 in two dimensions.

The drive element 6, which has a translational and a rotational degree of freedom, may be disposed in rolling, air, or magnetic bearings. A tubular linear motor in combination with a torque motor with primary and secondary parts of different lengths may be used as a rotary translation drive 7. These two motors are rotary current synchronous motors and permit stationary arrangement of their heavy primary coil parts that contain copper and iron. Thus, the design and constructional of the deflecting device 1 achieves a highly dynamic drive due to small moving masses, a good performance/space ratio (i.e., large forces can be exerted in a small space), a drive with a stationary energy supply and water cooling, stationary arrangement of the measuring heads, use of fewer and simpler bearings between drive and deflecting mirror as compared with conventional mirror holders, and a compact construction.

Figure 2:
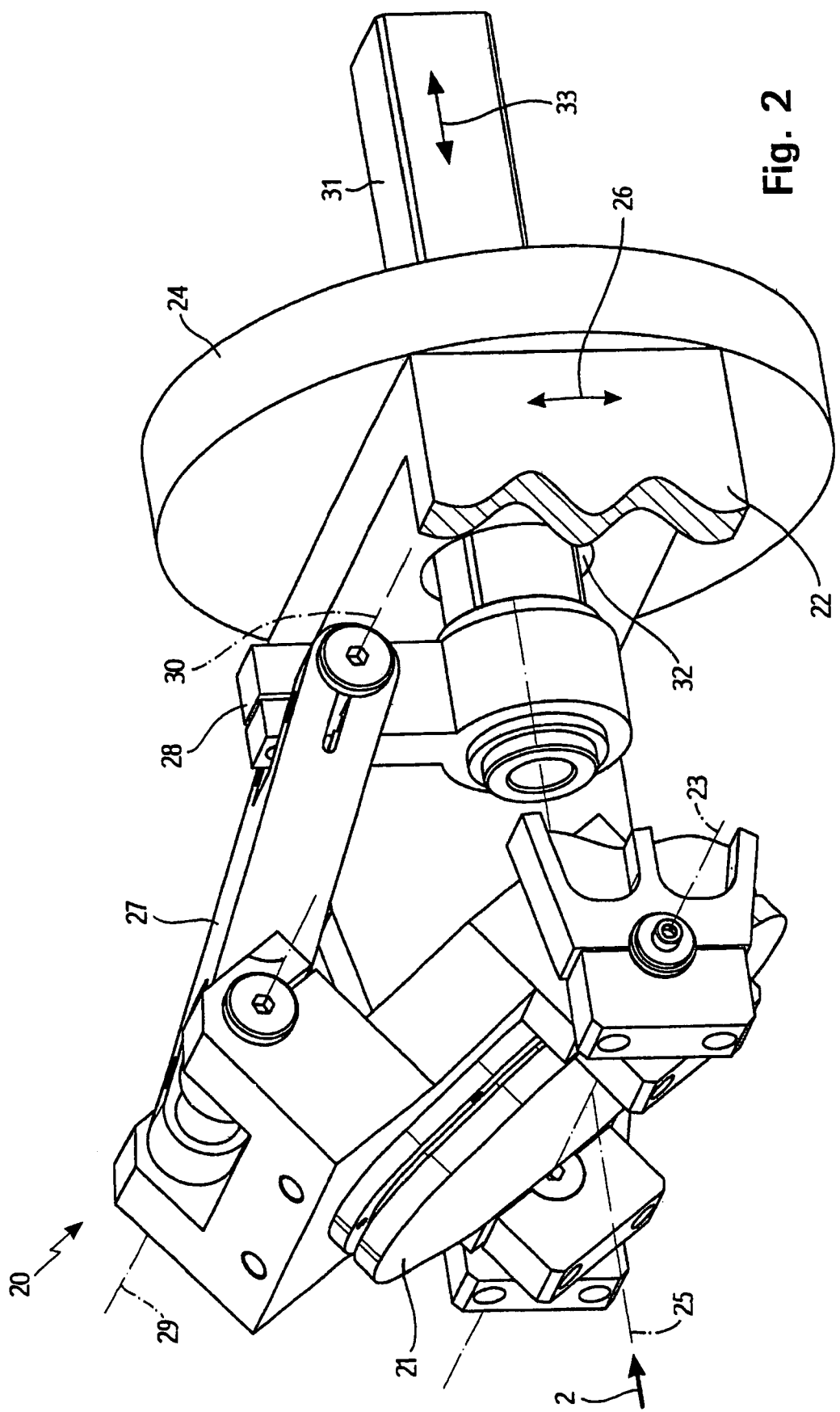
FIG. 2 is a schematic perspective view of a device for deflecting a laser beam.

The deflecting mirror 21 of the deflecting device 20 shown in FIG. 2 is also disposed in a fork-shaped holder 22 and allows pivoting of the mirror 21 about a first pivot axis 23 lying in its mirror surface. The holder 22 is disposed in a housing flange 24 such that the holder 22 can pivot about a second pivot axis 25 that extends at a right angle to the first pivot axis 23, but cannot be displaced along the second pivot axis 25. This second pivot axis 25 extends collinearly to the optical axis of the laser beam 2 that impinges on the deflecting device 20. The holder 22 is pivoted (as shown by double arrow 26) about the second pivot axis 25 using a rotary drive (not shown), for example, using a torque motor according to the principle of a rotary current synchronous motor. The deflecting mirror 21 can be articulated through a lever 27 coupled to a connecting element 28 rotatable coupler that is disposed between the deflecting mirror 21 and the holder 22. The lever 27 is disposed on the rear side of the deflecting mirror 21 and on the connecting element 28 such as to rotate about lever axes 29 and 30 that each extend parallel to the first pivot axis 23. The drive element 31 of a linear drive (not shown) extends through a central opening 32 of the holder 22 to the connecting element 28 that is disposed at the free end of the drive element 31, such that it can be rotated but not be axially displaced. In contrast to the connecting element 12 of the deflecting device 1, the connecting element 28 performs a linear and a rotary motion.

Pivoting of the holder 22 about the second pivot axis 25 also pivots the deflecting mirror 21 about the second pivot axis 25. A linear motion of the drive element 31 along the second pivot axis 25 (as shown by double arrow 33) displaces the connecting element 28 relative to the holder 22, since the holder 22 cannot be displaced, thereby pivoting the deflecting mirror 21 about the first pivot axis 23. The deflecting mirror 21 can be arbitrarily tilted about both pivot axes 23 and 25 through simultaneous pivoting of the holder 22 and displacement of the connecting element 28, thereby deflecting the impinging laser beam 2 in two dimensions.

This parallel kinematics allows the possibility of using two conventional direct drives with conventional measuring systems. The stators of the drives can be stationarily mounted with energy and cooling supply, and the measuring heads of the measuring systems can be stationarily mounted with measuring signal connections to both drives. Thus, the moving masses are minimized, which achieves maximum dynamics in connection with a mechanically rigid construction.

A number of implementations have been described. Nevertheless, it will be understood that various modifications may be made. Accordingly, other implementations are within the scope of the following claims.

What is claimed is:

1. An apparatus for deflecting a laser beam, the apparatus comprising:
    a deflecting mirror disposed in a holder, the mirror being pivotable about a first pivot axis lying on a surface of the mirror, wherein the holder is rotatable about a second pivot axis oriented substantially perpendicular to the first pivot axis to cause the mirror to rotate about the second pivot axis;
    a lever coupled to the mirror along a first lever axis parallel to and separated from the first pivot axis;
    a rotatable coupler coupled to the lever along a second lever axis parallel to and separated from the first pivot axis, wherein the coupler is rotatable about the second pivot axis and wherein the rotatable coupler and the holder are longitudinally translatable relative to each other along the second pivot axis; and
    a drive member longitudinally translatable along the second pivot axis to cause the mirror to rotate about the first pivot axis.

2. The apparatus of claim 1, wherein the drive member is coupled to the coupler.

3. The apparatus of claim 2, wherein the holder is disposed such that it cannot be displaced to translate the first lever axis while the first pivot axis remains fixed and thereby rotate the mirror about the first pivot axis.

4. The apparatus of claim 3, wherein the rotatable coupler is disposed between the deflecting mirror and the holder.

5. The apparatus of claim 4, wherein the drive member extends through a central opening of the holder to couple to the rotatable coupler.

6. The apparatus of claim 5, wherein the rotatable coupler is disposed on the drive member such that it can be rotated but cannot be longitudinally displaced along the second pivot axis.

7. The apparatus of claim 5, wherein the rotatable coupler and the drive member are coupled rigidly to each other and the drive member can be rotated about the second pivot axis but not be axially displaced.

8. The apparatus of claim 4, wherein the rotatable coupler is disposed on the drive member such that it can be rotated but cannot be longitudinally displaced along the second pivot axis.

9. The apparatus of claim 4, wherein the rotatable coupler and the drive member are coupled rigidly to each other and the drive member can be rotated about the second pivot axis but not be axially displaced.

10. The apparatus of claim 3, wherein the rotatable coupler is disposed on the drive member such that it can be rotated but cannot be longitudinally displaced along the second pivot axis.

11. The apparatus of claim 10, wherein the rotatable coupler and the drive member are coupled rigidly to each other and the drive member can be rotated about the second pivot axis but not be axially displaced.

12. The apparatus of claim 3, wherein the rotatable coupler and the drive member are coupled rigidly to each other and the drive member can be rotated about the second pivot axis but not be axially displaced.

13. The apparatus of claim 3, wherein the drive member is driven linearly for linearly displacing the rotatable coupler.

14. The apparatus of claim 1, wherein the drive member is coupled to the holder.

15. The apparatus of claim 14, wherein the rotatable coupler is disposed such that it cannot be longitudinally displaced along the second pivot axis to translate the first pivot axis while the first lever axis remains fixed and thereby rotate the mirror about the first pivot axis.

16. The apparatus of claim 15, wherein the holder is disposed between the deflecting mirror and the rotatable coupler.

17. The apparatus of claim 16, wherein the drive member extends through a central opening of the rotatable coupler to couple to the holder.

18. The apparatus of claim 17, wherein the drive member and the rotatable coupler are rotationally coupled to each other.

19. The apparatus of claim 16, wherein the drive member and the rotatable coupler are rotationally coupled to each other.

20. The apparatus of claim 15, further comprising a rotary translation drive member connected to the drive member, wherein the rotary translation drive member is longitudinally translatable to longitudinally translate the drive member along the second pivot axis, and wherein the rotary translation drive member is rotatable to rotate the holder about the second pivot axis.

21. The apparatus of claim 20, wherein the drive member and the rotatable coupler are rotationally coupled to each other.

22. The apparatus of claim 15, wherein the drive member and the rotatable coupler are rotationally coupled to each other.

* * * * *